United States Patent [19]

Kleykamp

[11] 4,249,665
[45] Feb. 10, 1981

[54] RAILWAY VEHICLE WEAR MEMBER

[75] Inventor: Donald L. Kleykamp, Springboro, Ohio

[73] Assignee: Dayco Corporation, Dayton, Ohio

[21] Appl. No.: 64,229

[22] Filed: Aug. 6, 1979

[51] Int. Cl.³ .......................... B61F 1/08; B61G 7/00; B61F 9/20; F16C 33/20

[52] U.S. Cl. ............... 213/61; 105/199 CB; 105/225; 105/420; 308/3 R; 308/138; 308/238; 308/244; 428/256

[58] Field of Search .............. 213/21, 50, 50.5, 51, 213/54, 58, 59, 60, 61, 62, 63, 64; 308/3 R, 237, 238, 244, 138; 428/119, 120, 256; 105/199 CB, 225, 420

[56] References Cited
U.S. PATENT DOCUMENTS

| | | | |
|---|---|---|---|
| 1,721,461 | 7/1929 | Mazer | 428/256 X |
| 2,728,698 | 12/1955 | Rudner | 428/256 |
| 3,033,623 | 5/1962 | Thomson | 308/238 |
| 3,872,640 | 3/1975 | Megumi | 428/256 X |
| 3,950,599 | 4/1976 | Board, Jr. | 308/238 X |
| 4,055,254 | 10/1977 | Chierici et al. | 213/21 X |
| 4,120,404 | 10/1978 | Chierici et al. | 213/62 R X |
| 4,133,434 | 1/1979 | Chierici | 213/60 |
| 4,188,888 | 2/1980 | Cooper et al. | 308/137 X |

*Primary Examiner*—Howard Beltran
*Attorney, Agent, or Firm*—Charles E. Bricker; Reuben Wolk

[57] ABSTRACT

A wear member for use between a pair of relatively movable components of a railway vehicle is provided where the wear member comprises a metal support adapted to be supported on one of the pair of components and a liner attached to the metal support wherein the liner is made of a polymeric matrix material which is reinforced by a metal structure having openings therein and such metal structure is disposed substantially centrally between opposed surfaces of the polymeric material and the opposed surfaces include a smooth antifriction wear surface engageable by the other of the pair of relatively moveable components; and, the liner is attached in position by metal members extending between the metal structure and the metal support through polymeric material disposed therebetween with a plurality of welds welding the metal members in position between the metal structure and the metal support.

9 Claims, 9 Drawing Figures

RAILWAY VEHICLE WEAR MEMBER

BACKGROUND OF THE INVENTION

1. Field of the Invention

This invention relates to railway vehicle structure and in particular to a wear member for use between a pair of relatively moveable components of such structure.

2. Prior Art Statement

It is known in the art to provide a wear member comprised of a metal support supported by at least one of a pair of relatively moveable components of a railway vehicle for the purpose of protecting the components from wear.

For example, it has been proposed in U.S. patent application Ser. No. 27,340 filed Apr. 5, 1979 to provide a wear member comprising a metal support having a continuous planar supporting surface, a polymeric material, and means attaching the polymeric material to the support and supporting same against the continuous supporting surface for the purpose of providing a substantially structurally self supporting wear member. The wear member as disclosed in this patent application utilizes a reinforcing material in the form of a metal structure having openings therein and such metal structure is welded directly against the metal support whereupon a polymeric material is formed around the metal structure on one side of the metal support resulting in the polymeric material being reinforced only along its inside portion while defining an exposed outside portion which is basically unreinforced.

It has also been proposed, in U.S. patent application Ser. No. 841,175 filed Oct. 11, 1977, now U.S. Pat. No. 4,188,888, issued Feb. 19, 1980 to provide a so-called wear member or liner for center plate structure of a railway vehicle which has a reinforcing material, also in the form of an expanded metal structure, embedded substantially centrally between opposed walls or surfaces of a polymeric material which serves as a matrix for the metal structure.

However, the first-mentioned wear member is deficient because its outside unreinforced portion of polymeric material is the one subjected to wear and under normal pressure during use has the tendency to "cold flow". The second-mentioned wear member for center plate structure has apertured reinforcing metal structure centrally embedded in polymeric material thereof whereby the polymeric material has minimum tendency to cold flow, however, it is also deficient because it has minimum self supporting structural strength and basically must be used between confining bearing surfaces which it serves to lubricate.

SUMMARY

It is a feature of this invention to provide a wear member for use between a pair of relatively movable components of a railway vehicle wherein such wear member comprises a metal support adapted to be supported on one of the pair of components and a liner attached to the metal support wherein the liner is made of a polymeric matrix material which is reinforced by a metal structure having openings therein and such metal structure is disposed substantially centrally between opposed surfaces of the polymeric material and the opposed surfaces include a smooth antifriction wear surface engageable by the other of the pair of relatively moveable components; and, such liner is attached in position by metal members extending between the metal structure and the metal support through polymeric material disposed therebetween with a plurality of welds welding the metal members in position between the metal structure and the metal support.

Another feature of this invention is to provide a wear member of the character mentioned in which the polymeric material is an ultra high molecular weight polymeric material.

Another feature of this invention is to provide a wear member of the character mentioned in which the metal support, metal structure, and metal members are made of compatible metals capable of being electrically welded in position after embedment of the metal structure in its polymeric matrix to define the liner.

Another feature of this invention is to provide a wear member of the character mentioned in which the metal members thereof are defined as part of one of the metal support and the metal structure.

Another feature of this invention is to provide a wear member of the character mentioned in which the metal members are defined as an integral part of the metal structure and extend transversely therefrom and the plurality of welds consists of welds welding the terminal outer ends of the members to the metal support.

Another feature of this invention is to provide a wear member of the character mentioned in which the metal structure thereof is a single piece expanded metal structure having a main body defined in a grid-like pattern and consisting of interconnected integral portions and the metal members consist of selected ones of the integral portions each having an end portion thereof extending transversely from the main body and the welds comprise welds welding the terminal outer ends of the metal members to the metal support.

Another feature of this invention is to provide a wear member of the character mentioned in which the metal members are initially independent members disposed between the metal structure and the metal support and the metal members have their opposite ends welded to the metal structure and the metal support.

Another feature of this invention is to provide an improved method of making a wear member of the character mentioned wherein a liner is made of a polymeric material with reinforcing metal structure embedded centrally therein and after such liner is made it is welded in position against a metal support while maintaining an undamaged and an unobstructed antifriction wear surface on the liner.

Another feature of this invention is to provide a method of the character mentioned in which welding is achieved employing an electrical welding system.

Another feature of this invention is to provide a method of making a wear member of the character mentioned in which the liner is welded to its associated metal support by metal members defined as a part of the metal support, the metal structure, or both.

Another feature of this invention is to provide a method of making a wear member of the character mentioned in which the metal members are initially independent members which are pierced through polymeric material of the liner disposed between the metal structure and the metal support of the wear member.

Therefore, it is an object of this invention to provide an improved wear member and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
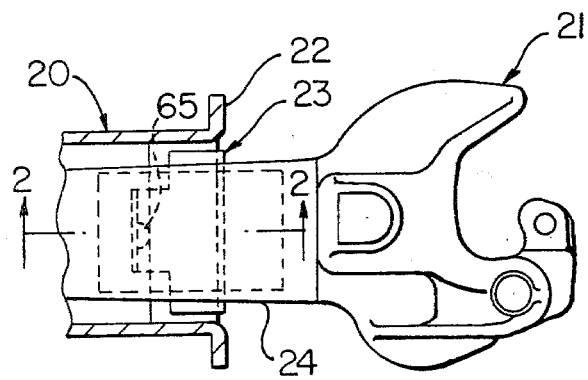
FIG. 1 is a fragmentary top plan view of an end portion of a railway freight car showing a coupler and a coupler carrier thereof and illustrating one exemplary embodiment of this invention in a form of a coupler carrier wear member disposed between such coupler and coupler carrier and wherein such wear member consists of a metal support and an attached liner.
Figure 2:
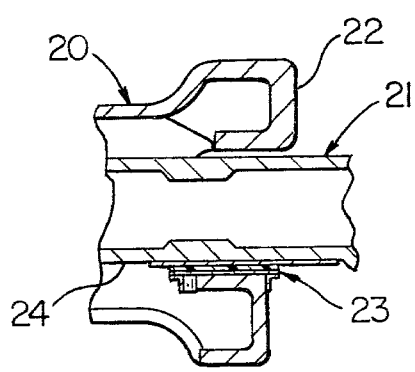
FIG. 2 is a fragmentary cross-sectional view taken essentially on line 2—2 of FIG. 1.

Reference is now made to FIGS. 1 and 2 of the drawings which illustrate a fragment of an end portion of an exemplary railway vehicle 20 and such vehicle has a coupler assembly 21 and a coupler carrier 22. As is shown in the art and as illustrated and described in the above-mentioned copending U.S. patent application Ser. No. 27,340, the coupler assembly 21 and coupler carrier 22 are relatively moveable and thus define what may be considered relatively moveable components of the vehicle 20. A wear member in accordance with the teachings of this invention is provided and designated generally by the reference numeral 23 and such wear member is supported by one of the components 21-22 and in this example the wear member is supported by the coupler carrier 22. The wear member 23 protects the components 21 and 22 and in particular the shank portion 24 of the coupler assembly 21 and coupler carrier 22 from wear during relative sliding movement thereof.

Figure 4:
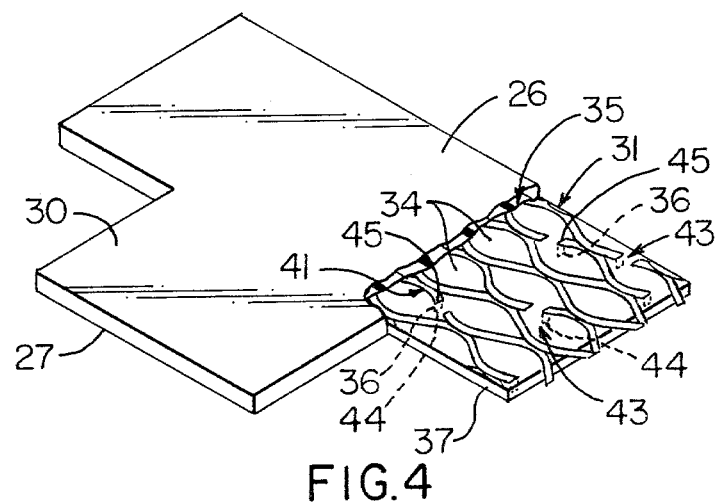
FIG. 4 is a perspective view with parts in cross section and parts broken away illustrating the member of FIG. 3 embedded within polymeric material to define the liner portion of the wear member of FIG. 1.
Figure 6:
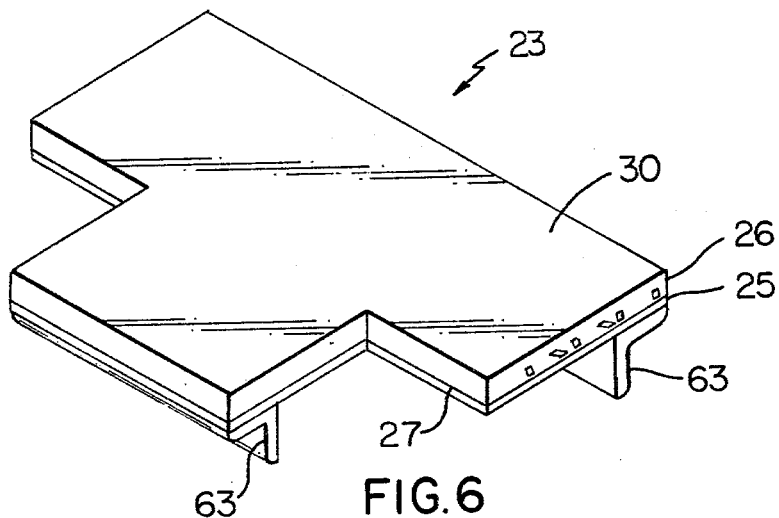
FIG. 6 is an enlarged perspective view of the wear member of FIG. 1 after fixing of the reinforced liner shown in FIG. 5 to the metal support thereof and showing support brackets fixed to the exposed surface of such metal support.

As seen in FIG. 6 the wear member 23 comprises a metal support, in the form of a high strength metal plate 25, which is adapted to be supported on the coupler carrier 22 and a liner 26, as also shown in FIG. 4, which is attached or fixed to the metal support 25. The liner 26 comprises an ultra high molecular polymeric material and is attached to the metal support 25 in accordance with the teachings of this invention. The liner has opposed surfaces 27 and 30 (FIG. 5) wherein the surface 27 is disposed adjacent the metal support 25 and in this example the surface 27 is disposed against the metal support 25. The surface 30 is a smooth anti-friction outer wear surface which is engageable by the shank portion 24 of the coupler assembly 21. The ultra high molecular weight polymeric material of the liner is designated by the reference numeral 32 and is essentially as described in the above-mentioned U.S. patent application Ser. No. 27,340, the disclosure of which is incorporated herein by reference thereto.

Figure 5:
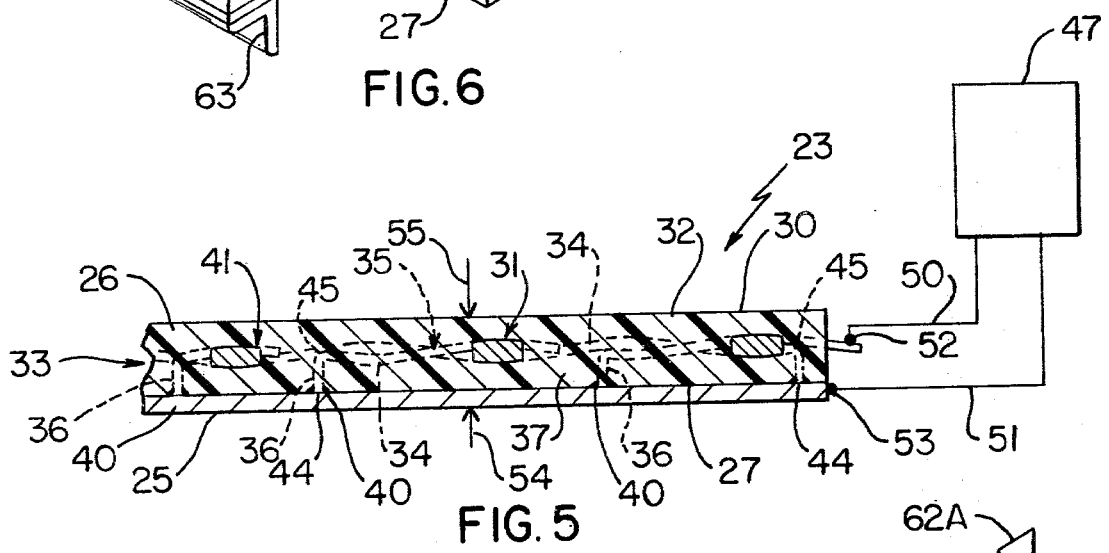
FIG. 5 is a fragmentary view with parts in cross section and parts shown schematically particularly illustrating the manner of fixing the liner of FIG. 4 to a metal support employing an electrical welding system.

The liner 26 has a metal structure which is designated generally by the reference numeral 31 which is embedded substantially centrally, as shown at 33 in FIG. 5, between the opposed surfaces 27 and 30 and the polymeric material 32 serves as a matrix for and substantially completely surrounds the metal structure. As will be readily apparent from FIG. 4 of the drawings, the metal structure 31 has openings 34 therein which receive the polymeric material 32 completely therethrough as shown at 35. The openings 34 provide optimum embedment of the metal structure 31; and, such structure 31 provides reinforcement for and prevents cold flow of the polymeric material 32.

In accordance with the teachings of this invention the exemplary wear member 23 of FIG. 5 has a plurality of metal members each designated by the same reference numeral 36 which extend between the metal structure 31 and the metal support 25 through a thickness 37 of polymeric material disposed between such metal structure 31 and metal support 25 and its associated one of the opposed surfaces and in this example members 36 extend through surface 27. The wear member 23 has weld means shown as a plurality of welds 40 welding the metal members 36 in position between the metal structure 31 and the metal support 25 and the welds 40 assure the provision of a high strength attachment of the liner 26 to the metal support 25. Further, the embedment of the metal structure 31 substantially centrally in the liner 26 provides optimum reinforcement and prevents cold flow of the polymeric material 32 as described earlier. In addition the manner in which the welds are provided assures that the surface 30 is a smooth antifriction surface which remains undisturbed and undamaged throughout the attaching operation thereby assuring optimum performance of such surface.

Figure 3:
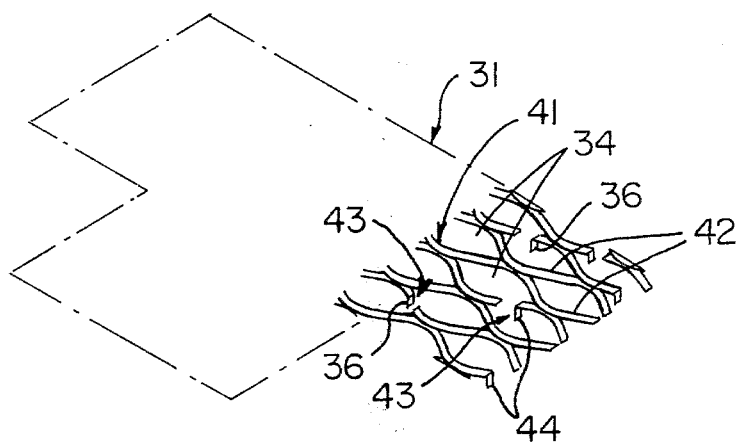
FIG. 3 is a fragmentary portion of a perspective view showing the metal structure which is embedded within the liner of the wear member of FIG. 1 prior to embedment thereof.

The metal members 36 of the wear member 23 may be defined as part of either the metal support 25 or the metal structure 31; and, in this example the metal members 36 are defined as part of the metal structure 31. The metal structure 31 is a single-piece expanded metal structure of a type known in the art and has a main body 41 which is disposed substantially in one plane and the main body consists of a grid-like pattern having interconnected integral portions (FIG. 3) with a representative few of such integral portions being designated by the reference numeral 42. The metal members 36 consist of selected ones of the integral portions, shown at a few typical locations 43 in FIG. 4, whereby the members 36 may be considered integral members. Each integral member 36 has one end portion 45 attached to the main body 41 and has an opposite end portion 44 which extends transverse the main body 41. In this example each end portion 44 extends perpendicular to the planar main body 41 and as seen in FIG. 5 welds 40 weld the terminal end of each end portion 44 to the metal support 25.

The metal structure 31 of this example is shown as an expanded metal structure having openings 34 therein for receiving polymeric material therethrough; however, it will be appreciated that the metal structure need not necessarily be expanded metal structure but may be any suitable metal structure having openings therein for receiving polymeric material therethrough to enable better embedment thereof while preventing cold flow of the polymeric material and with such structure having projections, or the like, extending therefrom which may be welded to metal support 25, as described.

The wear member 23 is preferably made in accordance with the method of this invention and such method comprises certain cooperating steps which will now be described in detail. In particular, the method comprises the steps of providing a metal support 25 which is adapted to be supported; i.e., detachably fastened, on the coupler carrier 22 and forming the reinforced antifriction polymeric liner 26 with opposed surfaces 27 and 30. The surface 27 is adapted to be disposed adjacent (against in this example) the metal support 25 while surface 30 is a smooth antifriction wear surface which remains undisturbed and serves as an antifriction wear surface.

The forming of the liner 26 comprises defining a plurality of openings 34 in the metal structure 31; and, in the case of expanded metal structure this is achieved by the usual cutting or slitting of a metal sheet to define a plurality of spaced parallel slits disposed in a predetermined geometric pattern and then pulling opposite side portions of the sheet perpendicular to the parallel relation of the slits to define the expanded metal structure. The metal structure 31 is then embedded in ultra high molecular weight polymeric material such as ultra high molecular weight polyethylene having molecular weight of at least 2 million using a suitable mold device, or the like, as is known in the art. The polyethylene serves as a matrix for and substantially completely surrounds the metal structure 31 and simultaneously the walls of the mold device define the opposed surfaces 27 and 30 of the polymeric material and liner 26. During the embedding step the openings 34 receive the polymeric material 32 completely therethrough resulting in better embedment of the metal structure whereby the structure 31 provideds reinforcement and prevents cold flow of the polymeric material during use of the liner 26 and wear member 23.

The method of this invention includes extending a plurality of metal members 36, which are an integral part of the structure 31, in mechanical and electrical contact between the metal structure 31 and the metal support 25 and through the thickness 37 of polymeric material 32 disposed between such metal structure 31 and metal support 25. A suitable electrical system, which is designated generally by the reference numeral 47 in FIG. 5, is-operatively connected between the metal structure 31 and metal support 25. The system 47 is operatively connected employing an electrical cable assembly 50 which has one end thereof suitably connected to the system 47 and its opposite end mechanically and electrically connected to the expanded metal structure 31, and as shown at 52; and, an electrical cable assembly 51 which has one end thereof suitably connected to the system 47 and its opposite end mechanically and electrically connected to the metal support 25, as shown at 53. The electrical system 47 may be of any suitable type known in the art and operates to provide a high electrical welding current between metal support 25 and a metal structure 31; and, with the terminal ends of the end portions 44 of integral members 36 held in mechanical and electrical contact welds 40 are provided where such terminal ends engage the metal support 25.

The electrical system 47 is operated to provide the above described welding action while holding the metal support 25 and reinforced liner 26 urged together employing suitable holding means and such holding means is indicated schematically by arrows 54 and 55 in FIG. 5 of the drawings. In essence, the holding means 54 and 55 urge the terminal ends of the end portions 45 of the integral members 36 against the metal support 25 with a predetermined mechanical force or pressure so as to provide a welding action once high current flow is provided by the electrical apparatus 47. Although the holding means may be any suitable type of device or apparatus known in the art, such holding means may comprise cooperating components of a standard press, or the like, which are electrically insulated from the liner 26 and the metal support 25.

The metal structure 31 is a single-piece expanded metal structure defined in a grid-like pattern and consisting of interconnected integral portions having opposite terminal ends. Selected ones of the integral portions are cut away from the main body and each selected integral portion is bent away from such main body about its opposite terminal end so that it extends transversely from its main body and preferably perpendicular thereto. Each of the integral portions 36 is extended through a thickness 37 of the liner 26 and this is preferably achieved while the expanded metal structure is being embedded during the embedding step.

Figure 8:
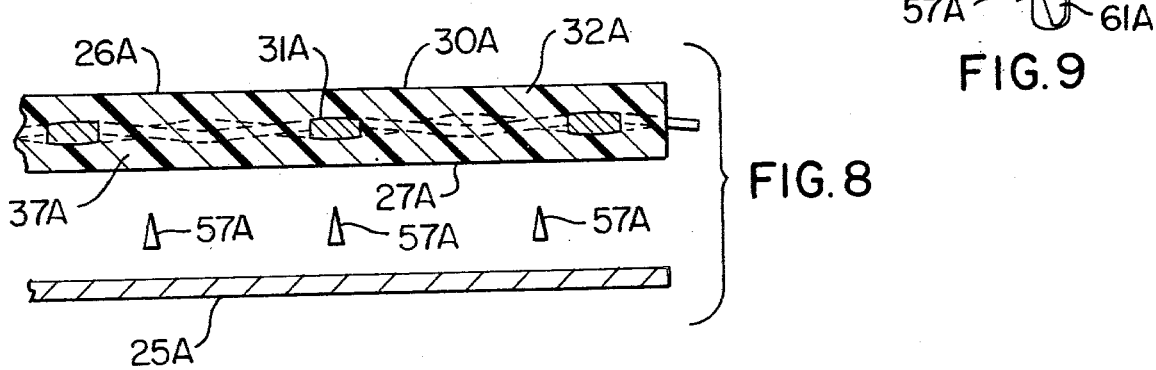
FIG. 8 is a view illustrating the wear member of FIG. 7 prior to assembly and welding of its associated components.
Figure 7:
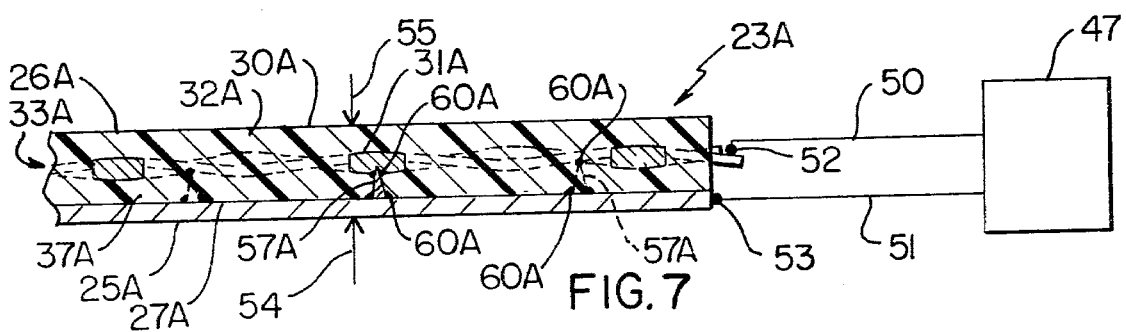
FIG. 7 is a view similar to FIG. 5 illustrating another exemplary embodiment of a wear member during welding of a liner thereof to an associated metal support using initially independent metal members.

Another exemplary embodiment of a wear member of this invention is illustrated in FIGS. 7-8 of the drawings. The wear member illustrated in FIGS. 7-8 is very similar to the wear member 23; therefore, such wear member will be designated by the reference numeral 23A and representative parts of such wear member which are similar to corresponding parts of the wear member 23 will be designated in the drawings by the same reference numeral as in the wear member 23 (whether or not such representative parts are mentioned in the specification) followed by the letter designation A. Only those component parts of the wear member 23A which are different from corresponding parts of the wear member 23 will be designated by a new reference numeral also followed by the letter designation A and described in detail.

As illustrated in FIG. 7 the wear member 23A consists of a metal support 25A and a liner 26A which has an expanded metal structure 31A suitably embedded therein substantially centrally as shown at 33A and for similar reasons as previously described in connection with the structure 31 of the wear member 23. The main difference between the wear member 23A and the wear member 23 is that the wear member 23A has members, each designated by the same reference numeral 57A, which are used to hold the components 25A and 26A together. The members 57A were initially independent members and are disposed between the metal structure 31A and the metal support 25A and weld means comprising welds 60A are provided at opposite ends of each of the members 57A to weld the metal components 25A, 31A, and 57A in a high strength manner.

Figure 9:
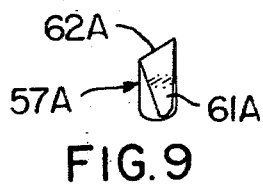
FIG. 9 is a perspective view illustrating a typical one of the metal members which are disposed between the reinforced liner and metal support prior to welding of such metal members in position.

As best seen in FIG. 9 of the drawings, each metal member 57A has a main body 61A provided with a knife-like edge 62A on at least one end thereof and the knife-like edge is pierced through the thickness 37A of polymeric material (FIG. 7) disposed between the metal structure 31A and the metal support 25A. The liner 26A is made with optimum simplicity by molding or otherwise forming the polymeric matrix 32A around the metal structure 31A so that such metal structure is disposed substantially midway or centrally in the polymeric matrix and while defining the planar parallel surfaces 27A and 30A on opposite sides of the liner 26A.

Once the liner 26A is formed it is suitably disposed in aligned relation above the metal support 25A as shown in FIG. 8 with the independent members 57A disposed therebetween. The previously described holding means 54 and 55 are then employed as shown in FIG. 7 to urge the components 25A and 26A toward each other whereby the knife-like edges 62A of the metal members 57A pierce through the thickness 37A of polymeric material, as shown. The holding means 54 and 55 hold the components 25A and 26A together and thereby hold the metal support 25A, metal structure 31A, and metal members 57A in mechanical and electrical contact to enable welding thereof. The welding is achieved in a similar manner as described in connection with the welding of the liner 23 and it will be seen that the electrical system 47 is employed for this purpose.

Thus, it is seen that the members 57A are initially independent members which are extended through the thickness 37A of polymeric material on the associated side of the expanded metal structure 31A after the liner 26A is formed whereby with this method it is not necessary to provide cutting and bending of selected integral portions of the expanded metal structure as was described in connection with the wear member 23. Instead, the only requirement in the forming of wear member 23A is the disposal of the members 57A in a predetermined pattern which assures engagement thereof with the metal portions of the expanded metal structure 31A.

In this disclosure of the invention the reinforcing metal structure of each liner 26 and 26A is shown and described as an expanded metal structure; however, as previously indicated such reinforcing metal structure may be any suitable structure having openings therein capable of receiving polymeric material therethrough for the purposes previously described. Further, the reinforcing metal structure should be such that it provides optimum reinforcement centrally between opposed planar surfaces of its liner.

FIGS. 5, 6, 7, and 8 of the drawings show expanded metal structure which is embedded within polymeric material and in each of these FIGS. a portion of the expanded metal structure extends outwardly from the end of the polymeric material. This presentation has been made merely to highlight that the expanded metal structure is to be connected with an electrical welding system. In addition, it is to be understood that a flat metal plate or sheet used to define the metal support 25 or 25A may be welded in the manner described herein to a sheet of reinforced liner having a corresponding size and shape whereupon the final configuration of the wear member may be cut from the above described welded components.

In any event, once the welding action in accordance with this invention has been achieved, expanded metal structure such as shown at the right hand side of each of FIGS. 5, 6, 7, and 8 is suitably cut away to define a smooth side edge portion for the resulting wear member, either 23 or 23A.

The wear member of this invention is preferably provided with suitable means to enable attachment thereof on the coupler carrier 22 and a pair of brackets 63 (FIG. 6) may be provided for this purpose. In addition, at least one of the brackets 63 may be provided with a locating projection 65, or the like, for locating the wear member on the coupler carrier.

The metal support 25 or 25A is preferably a metal plate or sheet of uniform thickness throughout and free of holes, apertures, or the like. In addition each support 25 and 25A may be made of ferrous or aluminous metal. Similarly, the metal structure 31 and 31A and the metal members 57A may also be made of ferrous or aluminous metal. However, it will be appreciated that the metal components being welded are preferably the same type of metal. For example, ferrous metal is preferably welded to ferrous metal.

The polymeric material has been described herein as being polymeric material of an ultra high molecular weight of at least two million and preferably such molecular weight is in the range of four to six million. The preferred technique for determining molecular weight is referred to as the intrinsic viscosity test and is widely used in the United States.

While present exemplary embodiments of this invention, and methods of practicing the same have been illustrated and described, it will be recognized that this invention may be otherwise variously embodied and practiced within the scope of the following claims.

What is claimed is:

1. In a wear member for a railway vehicle wherein said vehicle comprises a pair of relatively movable components and said wear member is adapted to be supported by one of said components and protects said components from wear during relative movement thereof; said wear member comprising; a metal support adapted to be supported on said one component; a liner attached to said metal support, said liner having opposed surfaces comprising an inner surface thereof disposed adjacent said metal support and a smooth anti-friction outer wear surface engageable by said other component; said liner comprising, an ultra high molecular weight polymeric material defining said opposed surfaces, and a metal structure embedded substantially centrally between said opposed surfaces of said polymeric material which serves as a matrix for and substantially completely surrounds said metal structure, said metal structure having openings therein which receive said polymeric material completely therethrough and provide better embedment of said metal structure, said structure providing reinforcement and preventing cold flow of said polymeric material; the improvement comprising, a plurality of metal members extending between said metal structure and said metal support through polymeric material disposed between said metal structure and metal support and its associated one of said opposed surfaces, and weld means welding said metal members in position to said metal support.

2. A wear member as set forth in claim 1 in which said metal members are defined as a part of one of said metal support and said metal structure.

3. A wear member as set forth in claim 1 in which said metal members are defined as an integral part of said metal structure, said metal members having terminal outer ends extending transversely of said metal structure through said polymeric material for contact with said metal support, and said weld means comprises a plurality of welds welding said terminal outer ends to said metal support.

4. A wear member as set forth in claim 1 in which said metal structure is a single-piece expanded metal structure having a main body defined in a grid-like pattern consisting of interconnected integral portions and said metal members consist of selected detached end portions extending transversely from said main body through said polymeric means in contact with said metal support, said weld means comprising a plurality of welds welding said end portions to said metal support.

5. A wear member as set forth in claim 1 in which said metal support, metal structure, and metal members are made of the same type of metal.

6. A wear member as set forth in claim 1 in which said ultra high molecular weight polymeric material has a molecular weight of at least 2 million.

7. A wear member as set forth in claim 1 in which said metal members are separate members disposed between and contacting said metal structure and said metal support, and said weld means comprises a plurality of welds welding opposite ends of said metal members to said metal structure and said metal support.

8. A wear member as set forth in claim 7 in which each of said metal members has a main body provided with a knife-like edge on at least one end thereof, said knife-like edge piercing said polymeric material and contacting said metal support.

9. A wear member as set forth in claim 7 in which said ultra high molecular weight polymeric material is polyethylene.

* * * * *